United States Patent [19]

Loiacono

[11] Patent Number: 5,293,422
[45] Date of Patent: Mar. 8, 1994

[54] USAGE CONTROL SYSTEM FOR COMPUTER SOFTWARE

[75] Inventor: Ronald Loiacono, Salinas, Calif.

[73] Assignee: Dynatek, Inc., Salinas, Calif.

[21] Appl. No.: 950,248

[22] Filed: Sep. 23, 1992

[51] Int. Cl.$^5$ ............................................. H04L 9/00
[52] U.S. Cl. ............................ 380/4; 364/DIG. 1; 364/245.8; 364/246.9
[58] Field of Search ............... 380/3, 4; 364/200, 900, 364/245.8, 246.9

[56] References Cited

U.S. PATENT DOCUMENTS

| | | |
|---|---|---|
| 4,568,306 | 12/1985 | Chou et al. . |
| 4,644,493 | 2/1987 | Chandra et al. . |
| 4,740,890 | 4/1988 | William . |
| 4,796,220 | 1/1989 | Wolfe ................................ 364/900 |
| 4,866,769 | 9/1989 | Karp . |
| 4,879,645 | 11/1989 | Tamada et al. ..................... 380/4 |
| 4,903,296 | 2/1990 | Chandra et al. . |
| 5,010,571 | 4/1991 | Katznelson ........................ 380/4 |
| 5,014,234 | 5/1991 | Edwards ........................... 380/4 |
| 5,073,933 | 12/1991 | Rosenthal ......................... 380/4 |
| 5,109,413 | 4/1992 | Comerford et al. . |
| 5,123,045 | 6/1992 | Ostrovsky et al. ................. 380/4 |

OTHER PUBLICATIONS

Perfect Filer; Perfect Software, Inc.; 1982; Berkeley, Calif.

*Primary Examiner*—Stephen C. Buczinski
*Attorney, Agent, or Firm*—Maurice M. Klee

[57] ABSTRACT

A system for making computer software consumable is provided. The software comprises a set of units, each of the units being an interactive activity between the program and the user which can be separately completed from the interactive activities of the other units in the set. The completion of units is monitored by means of a copy-protected region of a recording medium and when all units have been completed, further access to the software is denied. Among the applications for the system are academic tests composed of different subject categories, games having different levels of difficulty, and workbooks having different tasks to be performed.

21 Claims, 2 Drawing Sheets

USAGE CONTROL SYSTEM FOR COMPUTER SOFTWARE

BACKGROUND OF THE INVENTION

1. Field of the Invention

This invention relates to copy protection and usage control systems for computer software.

2. Description of the Prior Art

Various copy protection systems for computer software have been developed in the art. See, for example, Chandra et al., U.S. Pat. Nos. 4,644,493 and 4,903,296.

The basic form of these systems prevents a user from making a copy of a magnetic medium, such as a floppy disk, embodying the software which is to be protected. Other protection systems have been developed which restrict the us of the software to a single computer system. For example, software has been sold in combination with a hardware device which must be plugged into the computer's communication port before the software can be run. See, for example, Chou et al., U.S. Pat. No. 4,562,306. Encryption of codes stored in a ROM or secure coprocessor built into the user's computer have also been used for this purpose. See, for example, Karp, U.S. Pat. No. 4,866,769.

Variations of the foregoing techniques have allowed software distributors to control the length of time or the number of times a user can run protected software. See, for, example, Comerford et al., U.S. Pat. No. 5,109,413, and William. U.S. Pat. No. 4,740,890. These techniques have been developed to provide a trial period during which a potential purchaser can decide whether or not he or she wants to buy the software. After the trial period, either new software without the usage control system has been provided or instructions have been given to the user to disable the usage control system.

Although these approaches have to some extent imparted a limited life to computer software, they have not provided truly consumable software in the sense that a student workbook, a cross-word puzzle book, a game book, or a scholastic test is consumable. Consumable software would be of great value to the software industry, as well as to software purchasers, since it would allow software to be marketed on a finite usage basis rather than an unlimited usage basis. This would allow the purchaser to acquire only the amount of usage necessary to satisfy his or her needs, and would allow the software distributor to adjust the cost of the software to reflect the limited usage being provided.

SUMMARY OF THE INVENTION

In view of the foregoing state of the art, it is an object of this invention to provide an improved method for usage control and copy protection of computer software. More particularly, it is an object of the invention to provide computer software which is consumable in the sense that after a user has operated a portion of the software that portion cannot be again operated.

To achieve the foregoing and other objects, the invention in accordance with certain of its aspects provides a method for controlling usage of a software program on a personal computer, wherein the program comprises a set of units, each unit being an interactive activity between the program and the user which can be completed separately from the completion of the other units in the set, and the method includes the steps of:

(a) associating a label with each of the units;

(b) recording a list of the labels on a recording medium, said list being modifiable by the software program to identify those units which have been completed by the user;

(c) detecting the selection of a unit to be performed;

(d) comparing the selection of the unit to be preformed with the recorded list of labels to determine if the selected unit has been completed;

(e) denying access to the selected unit if it has been completed or allowing access to the selected unit if it has not been completed; and (f) detecting the act of completion of a unit by the user and modifying the list of labels to identify the completion of said unit.

In certain embodiments of the invention, the list of labels is stored in a copy-protected form. In other embodiments, the number of program units is recorded on the recording medium in a copy-protected form, this copy-protected number is decremented each time a unit is completed, and the user is denied access to the units once the number is decremented to zero. In a variation of this embodiment, instead of decrementing the copy-protected number of units, a record is kept of the number of completed units, and access is denied when the number of completed units equals the copy protected number of units. In the latter two embodiments, the list of labels does not have to be stored in a copy-protected form.

In certain preferred embodiments of the invention, the number of users of the software program is controlled by:

(i) recording a counter on the recording medium in a copy-protected form, said counter representing the initial allowable number of users of the software program;

(ii) associating an identifier with each new user of the software program and decrementing the counter by one; and (iii) denying access to the software program by further new users once the counter has been decremented to zero.

Alternatively, rather than decrementing the copy-protected counter representing the allowable number of users, a record can be kept of the number of registered users and access to the software can be denied once that number equals the initial allowable number of users.

In accordance with other aspects of the invention, apparatus for practicing these methods, as well as recording medium containing usage-controlled software of this type, are provided.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

Figure 1:
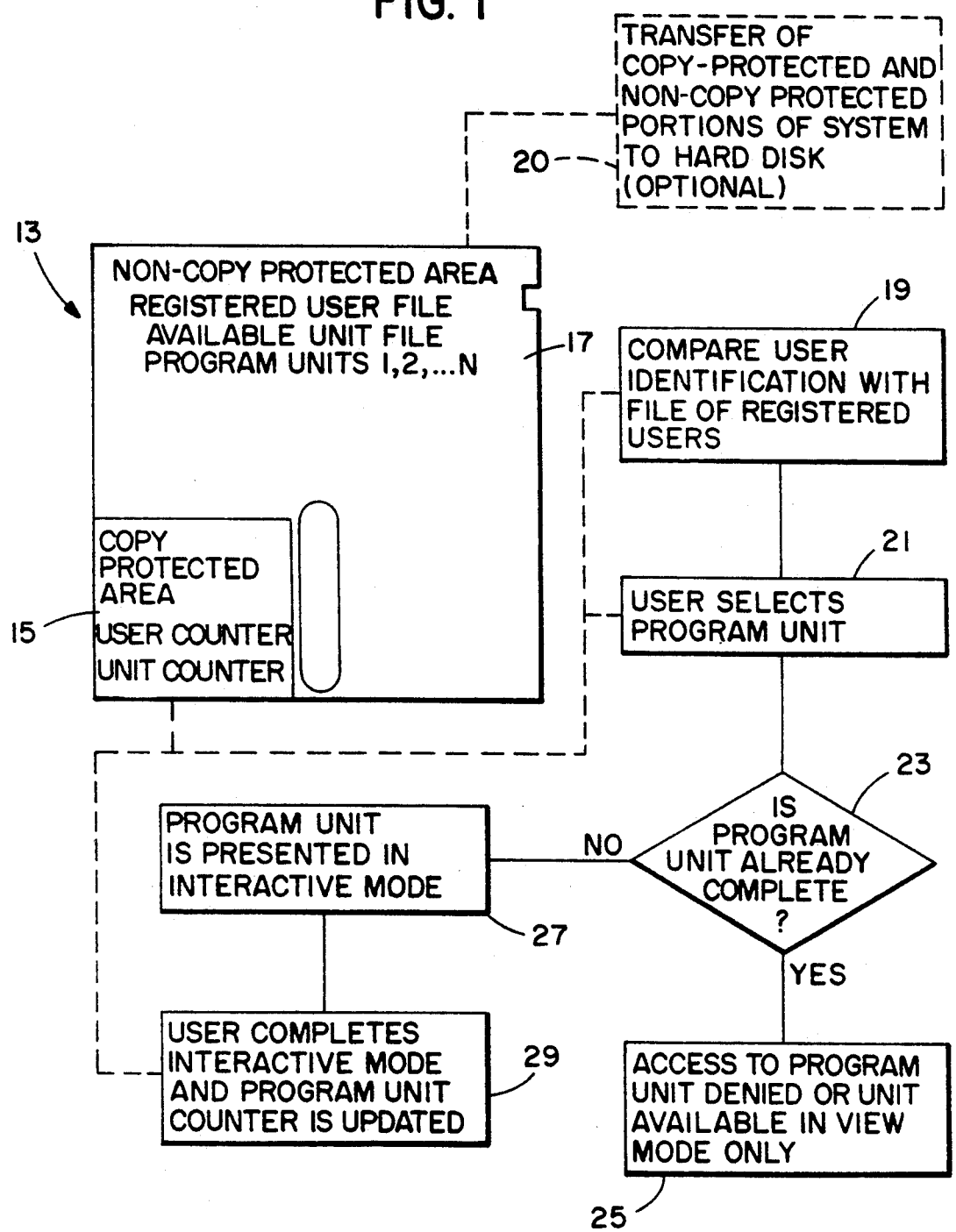
FIG. 1 is a block diagram of a multiple user embodiment of the invention.

As discussed above, the present invention relates to a method and apparatus for providing consumable software for use with a personal computer. As used herein, the term "personal computer" refers to a computer system designed to be used with a variety of commercial software distributed on a recording medium, e.g., a diskette, which is inserted into the computer system and read by the computer's operating system.

There are three main aspects to the invention: 1) the division of the software into separate units, each one of which is separately completed by the user; 2) the provision of a record or log of the units completed by the user; and 3) the provision of a copy protection system for the log or for a unit usage counter related to the log so that unauthorized, operative copies of the software program cannot be made. In this way, the software becomes consumable in the sense that once the user has completed a unit, that fact is recorded in the log and thereafter the user is denied access to the completed unit. Upon completion of all of the units, the software is fully consumed.

A particularly preferred application of the invention is in the area of testing. Conventional tests include different sections (units) which are to be taken and completed one at a time. By means of the invention, tests of this type can now be readily administered using a personal computer. Specifically, once a section of the test has been completed, the log is updated to indicate that fact and thereafter the test taker is prohibited from altering the answers he or she has made. Optionally, the test taker can also be prohibited from viewing the completed sections, although for some applications viewing may be allowed. (As used herein, the phrase "deny access" is intended to include cases where both viewing and altering are prohibited and cases where only altering is prohibited.)

Conventional student workbooks can also be implemented on a personal computer using the invention. In this case, each "page" of the workbook becomes a unit and once the student has completed the unit, he or she is prohibited from again performing the tasks of that unit. The unit is thus consumed or "used up" in the same manner as a page of a hardcopy workbook is used up once it has been worked on by a student.

For this application, the units will normally be viewable by the user after completion, although not alterable, just as the used pages of a hardcopy workbook are viewable after having been used. In addition to providing the workbook material to the student, the computer program can also monitor the student's responses and provide helpful feedback as the student progresses through the presented tasks.

In addition to student workbooks, other hardcopy materials which have consumable pages, e.g., puzzle books, game books, crossword puzzles, drawing books, and the like, can be implemented on a personal computer using the present invention. Also, electronic games can be implemented with each level of difficulty of the game comprising a separably-completable unit.

For some of these applications, it may be desirable to allow the user to suspend work on a unit before completion and then return to the unit for further work. In these cases, the log of completed units would generally not be updated until the unit was fully completed. Alternatively, if it is desired to allow such repeated access to a unit but to prohibit working on portions of the unit already completed, the log would record the level of partial completion and only allow access to the portion of the unit not previously worked on.

As discussed above, an important aspect of the invention is the use of a copy protection system for the log of completed units or for a unit usage counter related to the log. The copy-protection system serves two purposes. First, when applied directly to the log of completed units, it prohibits the user from tampering with the log in an effort to repeat a unit already completed. More importantly, however, it provides a mechanism whereby software programs can be distributed on an inexpensive recording medium, such as, a 5.25 inch floppy disk, a 3.5 inch diskette, or a similar medium now known or which may be developed in the future.

Without a copy protection system, the user could purchase one copy of the program and thereafter make numerous unauthorized copies. This problem, of course, has existed in the software industry generally. The solution to date has been to set a relatively high price for software so as to offset the loses resulting from such copying. As discussed above, one of the goals of the present invention is to provide a mechanism whereby the user can reduce his or her software costs by purchasing consumable software in the amount which the user needs. This goal would be defeated if a copy protection system was not used since in that circumstance the cost of the software would have to take into account unauthorized copying. That is, without a copy protection system, the software would have to be conventionally priced thus defeating the goal of providing reduced cost software.

A variety of copy protection systems have been developed in the art. In general terms, these systems make a portion or portions of the recording medium (e.g., one or more sectors on a diskette or a hard disk) readable or properly interpretable only by a proprietary input/output routine, i.e., the portion is not readable or properly interpretable by the standard bios routines used by the personal computer. Systems of this type are available from a number of commercial software houses. A preferred system is that sold by Microcosm Limited, 17 Cranbrook Road, Bristol BS6 7BL, United Kingdom, under the trademark COPYCONTROL.

As one example of a technique for achieving copy protection, a device driver can be provided with the software which writes and reads from a portion of the recording medium at a density different than that used by the standard operating system, e.g., an eight bit word can be stretched over the length which would normally be occupied by two words. Data written to the medium by such a driver, although readable by the standard operating system, would produce results easily recognized as invalid, i.e., the data would not be properly interpretable by the standard operating system. Such procedures can be used both on removable and non-removable recording media (see discussion below).

In accordance with the invention, copy protection can be deployed in a variety of ways. For example, a list of the software program's units can be stored on the recording medium in copy-protected form and modified by the software to identify those units which have been completed by the user.

Alternatively, if it is desired to use a copy-protected region of relatively small size, the total number of units ca be stored in copy-protected form and the list of units stored in non-copy protected form. As the units are completed, the total number of units is decremented until zero units are left, at which time further access to the software program is denied. Alternatively, instead of decrementing the total number of units, the number of units completed can be incremented and compared to the total number of units, with access being denied once the incremented number equals the total number.

In either case, the program keeps track of the identity of the units which have been completed and denies access to those so identified. These alternative approaches provide a somewhat lower level of protection in the sense that it is conceivable, although unlikely, that a user could change the list of units completed so as to permit repetition of a previously completed unit. However, such a change would be self-defeating because it would mean that the user could not perform all of the units making up the software since the copy-protected counter, whether of the decrementing or incrementing type, would change upon the repetition of the unit.

In addition to controlling the usage of the units making up the software, the copy-protected region or regions of the recording medium can also be used to control the number of users given access to the software. In particular, a user counter (or total user number) can be placed in the copy-protected region and a list of users maintained either in the copy-protected region or in a non-copy protected region of the recording medium. The copy-protected user counter is decremented (or a second counter is incremented) as users are added to the list, and access to new users is denied once the counter reaches zero (or the second counter equals the total user number).

In accordance with the invention, the software program is distributed on a recording medium which is insertable and removable from the personal computer, e.g., a diskette as opposed to a hard disk. In some cases, it may be desirable to transfer the program to a non-removable recording medium such as a hard disk and run the program from that medium.

In such a case, the copy-protected portion(s) of the removable recording medium should be transferred to copy-protected portion(s) of the non-removable recording medium. Also, at the time of transfer, the copy-protected portion(s) of the removable recording medium should be modified to indicate complete consumption of that medium, e.g., all units should be marked as completed or the unit usage counter should be set to a state corresponding to completion of all units. Routines for copying copy-protected regions from one recording medium to another are commercially available from such software vendors as Microcosm Limited referred to above.

With reference now to the figures, FIG. 1 shows a multiple-user embodiment of the invention employing a standard 5.25" floppy diskette 13. The diskette includes a copy-protected region 15 and a non-copy protected region 17. The copy-protected region includes a user counter (initial value M) and a unit counter (initial value zero). The non-copy protected region includes program units 1,2, ..., N, a registered user file, and an available unit file.

The various steps of the invention are set forth in program blocks 19 through 29. In the first step of the process (block 19), the user enters his or her identifier (e.g., his or her last name), and the program compares that identifier with the registered user file to determine if the user has or has not been previously registered. If previously registered, control is transferred to block 21; if not previously registered, the user counter is accessed to determine if that counter has been decremented to zero. If so, access to the program is denied; if not, the user's identifier is added to the registered user file, the user counter is decremented by one, the unit counter is incremented by N (the number of units), a record for the new user which contains a list of the program units is added to the available unit file, and control is then transferred to block 21.

In block 21, the program first examines the copy-protected unit counter to determine if that counter has been decremented to zero. If so, access to the program units, except possibly in a view mode, is denied.

If the unit counter has not been decremented to zero, a list of units is displayed to the user and the user is request to select the unit he or she wants to perform. (Alternatively, the program can automatically pick the next unit to be performed.) That selection is compared with the user's record in the available unit file to determine whether the selected unit has previously been completed. If so, access to the unit, except possibly in a view mode, is denied (block 25). If not, the user is allowed to interact with the program unit (block 27). Upon completion of the unit, the unit counter in the copy-protected region of disk 13 is decremented and the user's record in the available unit file is updated to show completion of the unit. Control is then transferred back to block 21 to allow the user to enter another activity (assuming the unit counter has not been decremented to zero) or exit the program.

Because of space constraints, a multiple user system of the type shown in FIG. 1 is preferably transferred from floppy disk 13 to a hard disk prior to operation (block 20). When the user counter has been decremented to zero, the user can insert a new floppy disk into his or her personal computer so that the program can update the hard disk user counter by the value of the user counter on the floppy disk. This updating can also be performed before the user counter has reached zero. In such a case, the value of the user counter on the floppy disk is added to the current value of the user counter on the hard disk. In either case, the user counter on the floppy disk is decremented to zero once the transfer to the hard disk has been made.

Figure 2:
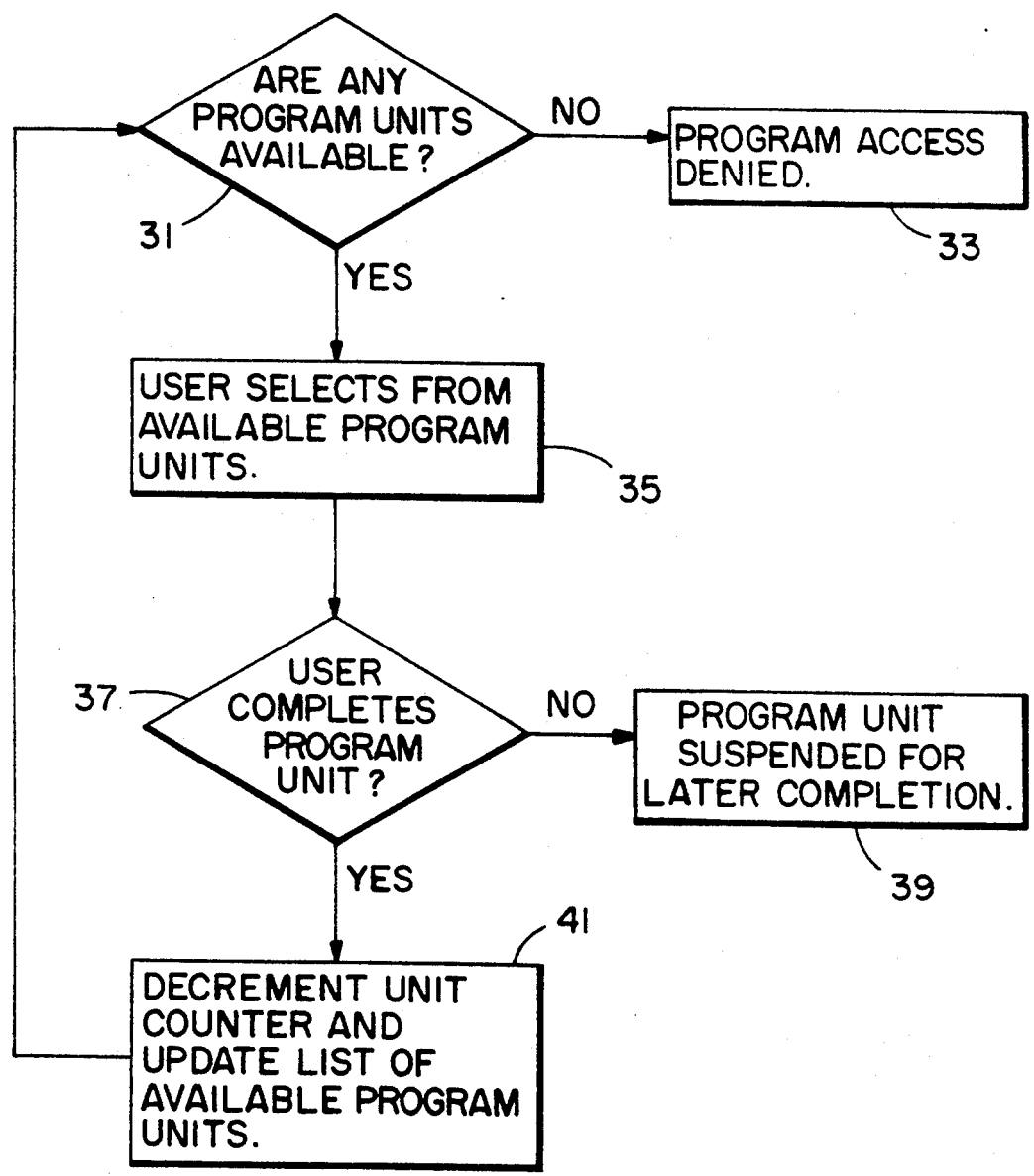
FIG. 2 is a block diagram of a single user embodiment of the invention.

FIG. 2 shows a single user embodiment of the invention. The program begins by determining if any program units are still available for use by accessing a copy-protected unit counter (block 31). If none are left, program access is denied (block 33). If non completed program units remain, those units are displayed to the user and the use is requested to make a selection (block 35). The selected unit is provided to the user who may or may not complete the unit in one sitting (block 37). If not completed, a marker (bookmark) is provided to show where the user stopped (block 39). If completed, the copy-protected unit counter is decremented and the list of available program units is updated (block 41) Control is then transferred back to block 31 and the process repeated by the user as desired.

For ease of presentation, the view mode of FIG. 1 (block 25) is not shown in FIG. 2 and the bookmark option of FIG. 2 (block 39) is not shown in FIG. 1. It is to be understood, of course, that these features can be used with either illustrated embodiment, as well as the more general embodiments discussed above.

Although specific embodiments of the invention have been described and illustrated, it is to be understood that a variety of modifications which do not depart from the scope and spirit of the invention will be evident to persons of ordinary skill in the art from the foregoing disclosure. The following claims are intended to cover the specific embodiments set forth herein as well as such modifications, variations, and equivalents.

What is claimed is:

1. A method for controlling usage of a software program on a personal computer, said program comprising a set of units, each unit being instructions for an interactive activity between the program and a user which is to be completed separately from the completion of the other units in the set, said method comprising:
 (a) associating a label with each of the units;
 (b) recording a list of the labels on a recording medium, said list (i) being modifiable by the software program to identify those units which have been completed by the user, and (ii) being stored in a copy-protected form;
 (c) detecting the selection of a unit to be performed;
 (d) comparing the selection of the unit to be performed with the recorded list of labels to determine if the selected unit has been completed;
 (e) denying access to the selected unit if it has been completed or allowing access to the selected unit if it has not been completed; and
 (f) detecting the act of completion of a unit by the user and modifying the list of labels to identify the completion of said unit.

2. A method for controlling usage of a software program on a personal computer, said program comprising a set of units, each unit being instructions for an interactive activity between the program and a user which is to be completed separately from the completion of the other units in the set, said method comprising:
 (a) associating a label with each of the units;
 (b) recording a list of the labels on a recording medium, said list being modifiable by the software program to identify those units which have been completed by the user;
 (c) recording the number of units in the set on the recording medium in a copy-protected form;
 (d) detecting the selection of a unit to be performed;
 (e) comparing the user's selection with the recorded list of labels to determine if the selected unit has been completed;
 (f) denying access to the selected unit if it has been completed or allowing access to the selected unit if it has not been completed;
 (g) detecting the act of completion of a unit by the user and
  (i) modifying the list of labels to identify the completion of said unit; and
  (ii) decrementing the recorded number of units; and
 (h) denying the user access to the set of units once the recorded number of units has been decremented to zero.

3. A method for controlling usage of a software program on a personal computer, said program comprising a set of units, each unit being instructions for an interactive activity between the program and a user which is to be completed separately from the completion of the other units in the set, said method comprising:
 (a) associating a label with each of the units;
 (b) recording a list of the labels on a recording medium, said list being modifiable by the software program to identify those units which have been completed by the user;
 (c) recording the number of units in the set on the recording medium in a copy-protected form;
 (d) detecting the selection of a unit to be performed;
 (e) comparing the user's selection with the recorded list of labels to determine if the selected unit has been completed;
 (f) denying access to the selected unit if it has been completed or allowing access to the selected unit if it has not been completed;
 (g) detecting the act of completion of a unit by the user and
  (i) modifying the list of labels to identify the completion of said unit; and
  (ii) recording the number of completions; and
 (h) denying the user access to the set of units once the number of completions recorded in step (g) (ii) is equal to the number of units recorded in step (c).

4. The method of claim 1, 2, or 3 wherein the interactive activity includes inputting data to the personal computer and displaying of that data on the computer and the denying of access to a selected unit prohibits inputting but not displaying.

5. The method of claim 1, 2, or 3 wherein the interactive activity includes inputting data to the personal computer and displaying of that data on the computer and the denying of access to a selected unit prohibits both inputting and displaying.

6. The method of claim 1, 2, or 3 including the additional steps of:
 (i) recording a counter on the recording medium in a copy-protected form, said counter representing the initial allowable number of users of the software program;
 (ii) associating an identifier with each new user of the software program and decrementing the counter by one;
 (iii) denying access to the software program by further new users once the counter has been decremented to zero.

7. The method of claim 1, 2, or 3 including the additional steps of:
 (i) recording an allowable number of users on the recording medium in a copy-protected form;
 (ii) associating an identifier with each new user of the software program and recording the number of such identifiers;
 (iii) denying access to the software program by further new users once the number of identifiers recorded in step (ii) is equal to the allowable number of users recorded in step (i).

8. A removable recording medium for use with a personal computer, said recording medium having coded thereon (a) a software program comprising a set of units, each unit being instructions for an interactive activity between the program and a user which is to be completed separately from the completion of the other units in the set, and (b) a list of labels associated with the units, said list (i) being modifiable by the software program to identify those units which have been completed by the user, and (ii) being stored on the recording medium in a copy-protected form, wherein the software program denies access to those units which have been identified as having been completed by the user.

9. A removable recording medium for use with a personal computer, said recording medium having coded thereon (a) a software program comprising a set of units, each unit being instructions for an interactive activity between the program and a user which is to be completed separately from the completion of the other units in the set and (b) a record of the number of units in the set, said record being stored on the recording medium in a copy-protected form, wherein the software program either decrements the record of the number of units in the set each time a unit is completed and denies access to the set of units once said record has been decremented to zero or records the number of unit completions and denies access to the set of units once the number of unit completions is equal to the number of units in the set.

10. The removable recording medium of claim 8 or 9 having coded thereon a record of the number of allowable users of the software program, said record being stored on the recording medium in a copy-protected form.

11. A removable recording medium for use with a personal computer, said recording medium having coded thereon (a) a software program comprising a set of units, each unit being instructions for an interactive activity between the program and a user which is to be completed separately from the completion of the other units in the set, and (b) a record of the number of allowable users of the software program, said record being stored on the recording medium in a copy-protected form, wherein the software program associates an identifier with each new user of the software program and either decrements the record of the number of allowable users each time an identifier is associated with a new user and denies access to the software program by further new users once said record has been decremented to zero or records the number of identifiers and denies access to the software program by further new users once the number of identifiers is equal to the number of allowable users.

12. A controlled-usage computer system comprising:
(a) a computer having (i) a non-removable recording means and (ii) means for receiving a removable recording medium;
(b) a removable recording medium having coded thereon (A) a software program comprising a set of units, each unit being instructions for an interactive activity between the program and a user which is to be completed separately from the completion of the other units in the set, and (B) a list of labels associated with the units, said list (i) being modifiable by the software program to identify those units which have been completed by the user, and (ii) being stored in a copy-protected form;
(c) means for copying the software program and the list of labels from the removable recording medium to the non-removable recording medium, said means (i) copying the list of labels onto the non-removable recording medium in copy-protected form and (ii) modifying the list of labels on the removable recording medium so that all units are identified as having been completed;
(d) means for detecting the selection of a unit to be performed;
(e) means for comparing the selection of the unit to be performed with the list of labels on the non-removable recording medium to determine if the selected unit has been completed;
(f) means for denying access to the selected unit if it has been completed or allowing access to the selected unit if it has not been completed; and
(g) means for detecting the act of completion of a unit and modifying the list of labels on the non-removable recording medium to identify the completion of said unit.

13. A controlled-usage computer system comprising:
(a) a computer having (i) a non-removable recording means and (ii) means for receiving a removable recording medium;
(b) a removable recording medium having coded thereon (A) a software program comprising a set of units, each unit being instructions for an interactive activity between the program and a user which is to be completed separately from the completion of the other units in the set, and (B) a list of labels associated with the units, said list being modifiable by the software program to identify those units which have been completed by the user, and (C) a record of the number of units in the set, said record being stored on the recording medium in a copy-protected form;
(c) means for copying the software program, the list of labels, and the record of the number of units from the removable recording medium to the non-removable recording medium, said means (i) copying the record of the number of units onto the non-removable recording medium in copy-protected form and (ii) decrementing the number of units on the removable recording medium to zero;
(d) means for detecting the selection of a unit to be performed;
(e) means for comparing the selection of the unit to be performed with the list of labels on the non-removable recording medium to determine if the selected unit has been completed;
(f) means for denying access to the selected unit if it has been completed or allowing access to the selected unit if it has not been completed;
(g) means for detecting the act of completion of a unit and
  (i) modifying the list of labels on the non-removable recording medium to identify the completion of said unit; and
  (ii) decrementing the copy-protected record of the number of units on the non-removable recording medium; and
(h) means for denying access to the set of units once the record of the number of units recorded on the non-removable recording medium has been decremented to zero.

14. A controlled-usage computer system comprising:
(a) a computer having (i) a non-removable recording means and (ii) means for receiving a removable recording medium;
(b) a removable recording medium having coded thereon (A) a software program comprising a set of units, each unit being instructions for an interactive activity between the program and a user which is to be completed separately from the completion of the other units in the set, (B) a list of labels associated with the units, said list being modifiable by the software program to identify those units which have been completed by the user, and (C) a record of the number of units in the set, said record being stored on the recording medium in a copy-protected form;
(c) means for copying the software program, the list of labels, and the record of the number of units from the removable recording medium to the non-removable recording medium, said means (i) copying the record of the number of units onto the non-removable recording medium in copy-protected form and (ii) decrementing the number of units on the removable recording medium to zero;

(d) means for detecting the selection of a unit to be performed;

(e) means for comparing the selection of the unit to be performed with the list of labels on the non-removable recording medium to determine if the selected unit has been completed;

(f) means for denying access to the selected unit if it has been completed or allowing access to the selected unit if it has not been completed;

(g) means for detecting the act of completion of a unit and
  (i) modifying the list of labels on the non-removable recording medium to identify the completion of said unit; and
  (ii) recording the number of completions on the non-removable recording medium; and (h) means for denying access to the set of units once the number of completions recorded on the non-removable recording medium is equal to the number of units recorded on the non-removable recording medium.

15. A controlled-usage computer system comprising:

(a) a computer having (i) a non-removable recording means and (ii) means for receiving a removable recording medium;

(b) a removable recording medium having coded thereon (A) a software program comprising a set of units, each unit being instruction for an interactive activity between the program and a user which is to be completed separately from the completion of the other units in the set, (B) a list of labels associated with the units, said list being modifiable by the software program to identify those units which have been completed by each user of the software program, and (C) a counter representing the initial allowable number of users of the software program, said counter being stored in a copy-protected form;

(c) means for copying the software program, the list of labels, and the counter from the removable recording medium to the non-removable recording medium, said means (i) copying the counter onto the non-removable recording medium in copy-protected form and (ii) decrementing the counter on the removable recording medium to zero;

(d) means for associating an identifier with each new user of the software program and decrementing the counter on the non-removable recording medium by one;

(e) means for denying access to the software program by further new users once the counter has been decremented to zero;

(f) means for detecting a user's identifier and said user's selection of a unit to be performed;

(g) means for comparing the selection of the unit to be performed with the list of labels on the non-removable recording medium to determine if the selected unit has been completed by said user;

(h) means for denying access to the selected unit by said user if the selected unit has been completed or allowing access to the selected unit if it has not been completed; and (i) means for detecting the act of completion of a unit by said user and modifying the list of labels on the non-removable recording medium to identify said user's completion of said unit.

16. A controlled-usage computer system comprising:

(a) a computer having (i) a non-removable recording means and (ii) means for receiving a removable recording medium;

(b) a removable recording medium having coded thereon (A) a software program comprising a set of units, each unit being instructions for an interactive activity between the program and a user which is to be completed separately from the completion of the other units in the set, (B) a list of labels associated with the units, said list being modifiable by the software program to identify those units which have been completed by each user of the software program, and (C) a counter representing the initial allowable number of users of the software program, said counter being stored in a copy-protected form;

(c) means for copying the software program, the list of labels, and the counter from the removable recording medium to the non-removable recording medium, said means (i) copying the counter onto the non-removable recording medium in copy-protected form and (ii) decrementing the counter on the removable recording medium to zero;

(d) means for associating an identifier with each new user of the software program and recording the number of such users on the non-removable recording medium;

(e) means for denying access to the software program by further new users once the recorded number of identifiers is equal to the allowable number of users;

(f) means for detecting a user's identifier and said user's selection of a unit to be performed;

(g) means for comparing the selection of the unit to be performed with the list of labels on the non-removable recording medium to determine if the selected unit has been completed by said user;

(h) means for denying access to the selected unit by said user if the selected unit has been completed or allowing access to the selected unit if it has not been completed; and (i) means for detecting the act of completion of a unit by said user and modifying the list of labels on the non-removable recording medium to identify said user's completion of said unit.

17. A controlled-usage computer system comprising:

(a) a computer having (i) a non-removable recording means and (ii) means for receiving a removable recording medium;

(b) a removable recording medium having coded thereon (A) a software program comprising a set of units, each unit being instructions for an interactive activity between the program and a user which is to be completed separately from the completion of the other units in the set, (B) a list of labels associated with the units, said list being modifiable by the software program to identify those units which have been completed by each user of the software program, and (C) a counter representing the allowable number of users of the software program, said counter being stored in a copy-protected form;

(c) means for copying the software program, the list of labels, and the allowable user counter from the removable recording medium to the non-removable recording medium, said means (i) copying the allowable user counter onto the non-removable recording medium in copy-protected form, (ii)

decrementing the allowable user counter on the removable recording medium to zero, and (iii) creating a unit counter on the non-removable recording medium whose value is equal to number of units times the number of allowable users;

(d) means for associating an identifier with each new user of the software program;

(e) means for detecting a user's identifier and said user's selection of a unit to be performed;

(f) means for comparing the selection of the unit to be performed with the list of labels on the non-removable recording medium to determine if the selected unit has been completed by said user;

(g) means for denying access o the selected unit by said user if the selected unit has been completed or allowing access to the selected unit if it has not been completed;

(h) means for detecting the act of completion of a unit by said user and
  (i) modifying the list of labels on the non-removable recording medium to identify said user's completion of said unit, and
  (ii) decrementing the unit counter by one; and (i) means for denying access to the software program once the unit counter has been decremented to zero.

18. The controlled-usage computer system of claim 17 wherein the unit counter is stored on the non-removable recording medium in copy-protected form.

19. The controlled-usage computer system of claim 17 further including means for incrementing the allowable user counter and the unit counter on the non-removable recording medium from a removable recording medium.

20. A removable recording medium for use with a personal computer which includes a non-removable recording means, said removable recording medium having coded thereon (a) a software program comprising a set of units, each unit being instructions for an interactive activity between the program and a user which is to be completed separately from the completion of the other units in the set and (b) a record of the number of allowable users of the software program, said record being stored on the removable recording medium in a copy-protected form, wherein the software program decrements the record of the number of allowable users on the removable recording medium to zero upon transfer of said number to the non-removable recording means.

21. The removable recording medium of claim 8, 9, 11, or 20 wherein the units of the software program are portions of a test, game, puzzle book, or workbook.

* * * * *